United States Patent [19]

Sims et al.

[11] 4,147,413

[45] Apr. 3, 1979

[54] TEMPERATURE COMPENSATED LENS MOUNT

[75] Inventors: David J. Sims; Billy D. Miracle, both of Loveland, Colo.

[73] Assignee: Hewlett-Packard Company, Palo Alto, Calif.

[21] Appl. No.: 775,085

[22] Filed: Mar. 7, 1977

[51] Int. Cl.$^2$ ............................................. G02B 7/02
[52] U.S. Cl. .................................................. 350/253
[58] Field of Search ........................ 350/252, 253, 310

[56] References Cited

U.S. PATENT DOCUMENTS

| | | | |
|---|---|---|---|
| 1,417,326 | 5/1922 | Jacobsson | 350/253 UX |
| 2,423,491 | 7/1947 | Fairbank | 350/252 |
| 2,423,492 | 7/1947 | Fairbank | 350/252 |
| 3,601,343 | 8/1971 | Sivaslian | 350/252 |
| 3,676,274 | 7/1972 | Matulis | 350/310 X |
| 4,045,129 | 8/1977 | Hamar | 350/252 |

Primary Examiner—F. L. Evans
Attorney, Agent, or Firm—Michael L. Sherrard

[57] ABSTRACT

An epoxy/aluminum sandwich is used to mount a glass lens rigidly within a stainless steel cell without subjecting the glass lens to stresses caused by differences between the temperature coefficients of expansion of the glass lens and the stainless steel cell.

6 Claims, 4 Drawing Figures

TEMPERATURE COMPENSATED LENS MOUNT

BACKGROUND AND SUMMARY

The difference in the temperature coefficients of expansion between a lens and a frame, called a cell herein, to which it is mounted, can cause stresses resulting in distortion of the lens element. This is especially significant in optical elements such as mirrors which are rigidly mounted to a cell since the cell normally has a greater temperature coefficient of expansion than the mirror and as temperatures increase the cell will expand faster than the mirror. This will effectively stretch the mirror as a "diaphragm" and reduce the curvature of the mirror, degrading it's optical properties. The difference in the temperature coefficients of expansion between a lens and a cell to which it is mounted can also cause stresses parallel with the contacting surfaces which can cause fractures in noncompliant materials such as lens glass. In optical systems which operate in non-controlled temperature environments, such as surveying instruments, a common method to avoid these undesirable stresses has been to use a pinching technique upon the optical surfaces of the element to hold it in place leaving the end of the optical element free to move. However this method does not rigidly maintain the lens element in a fixed position. A second method especially used in large telescopes has been to elastically mount the element and then readjust the position of the element as required. Again, this relieves stresses upon the optical element but does not rigidly align the element. The present invention allows for the rigid mounting of a lens within a cell to achieve a precise alignment while also eliminating stress between the lens and the cell caused by different temperature coefficients of expansion between the optical element and the cell.

DETAILED DESCRIPTION

Figure 1:
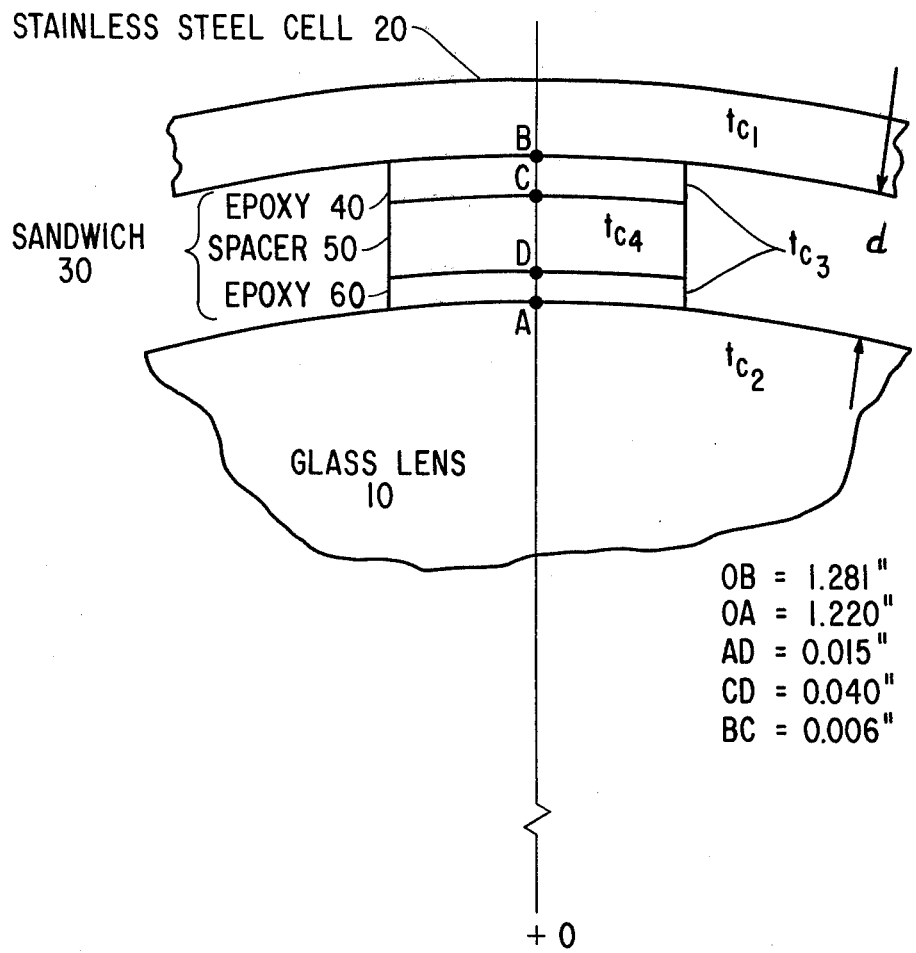
FIG. 1 is a side view of the present invention used to mount a glass lens to a stainless steel cell.

Referring to FIG. 1, a glass lens 10 having a radius equal to OA, is to be mounted within a stainless steel cell 20 having an inner-radius equal to OB. In the preferred embodiment of the present invention the cell is made of stainless steel which has a temperature coefficient of $t_{c1} = 5.5 \times 10^{-6}$ inches per inch degree Fahrenheit. The glass lens 10 has a temperature coefficient of approximately $t_{c2} = 3.94 \times 10^{-6}$ inches per inch Fahrenheit. Therefore the distance d illustrated in FIG. 1 between the cell and the lens will increase by:

$$\Delta d = OB^* t_{c1} - OB^* t_{c2}$$

for a one degree increase in temperature. The present invention inserts a sandwich 30 between the cell 20 and the lens 10. The sandwich 30 has a net temperature coefficient and a width d such that the expansion of the sandwich 30 due to a temperature change will equal the change in the separation between the cell 20 and the lens 10 due to the temperature change. In the present embodiment the sandwich is made of two layers of epoxy 40 and 60 and an aluminum spacer 50. The epoxy has a temperature coefficient of approximately $81.1 \times 10^{-6}$ per degree Fahrenheit at 75°. The aluminum spacer has a temperature coefficient of approximately $13.2 \times 10^{-6}$ per degree Fahrenheit. The dimensions are chosen such that:

$$OB^* t_{c1} - OA^* t_{c2} = t_{c3} \,^*[\text{total epoxy thickness}] + t_{c4} \,^*[\text{aluminum thickness}].$$

The use of epoxy in the sandwich 30 allows a rigid bond between the cell and the lens simultaneously with a method for stress free mounting the lens with varying temperatures. The lens can be precisely positioned while the epoxy is in its fluid state, and after the epoxy has hardened the lens is rigidly mounted such that the lens maintains its alignment in varying temperatures and is not subjected to radial stresses.

Stresses tangential to the radius of the lens also arise between the cell and the lens when two materials having dissimilar temperature coefficients of expansion are bonded together and subsequently subjected to temperature variations. Some materials, such as the aluminum spacer 50 and the stainless steel cell 20 can tolerate stresses along the bond lines due to their ductile nature. However, excessive tangential stresses applied to a noncompliant and brittle material such as glass lens 10 will cause the glass to fracture along the bond lines causing a partial or complete loss of attachment between the lens 10 and the cell 20. Additionally, the optical characteristics of the glass lens proximate to the fracture are destroyed. I call this phenomena "pullout."

Figure 2:
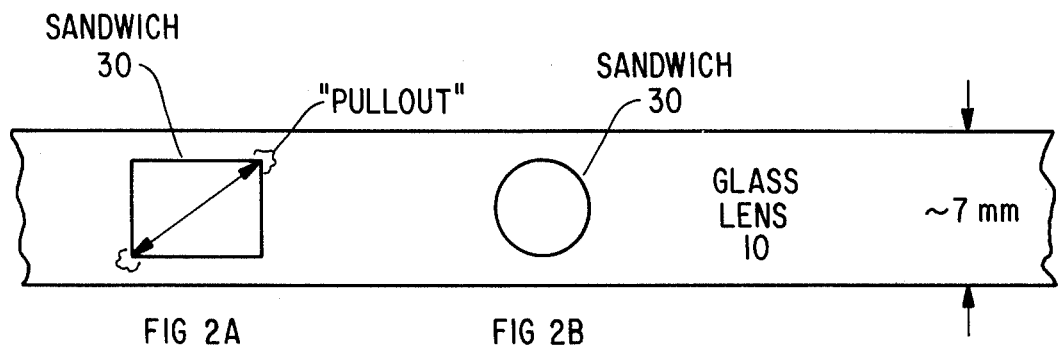
FIG. 2 is a top view of two types of the sandwich of FIG. 1.
Figure 3:
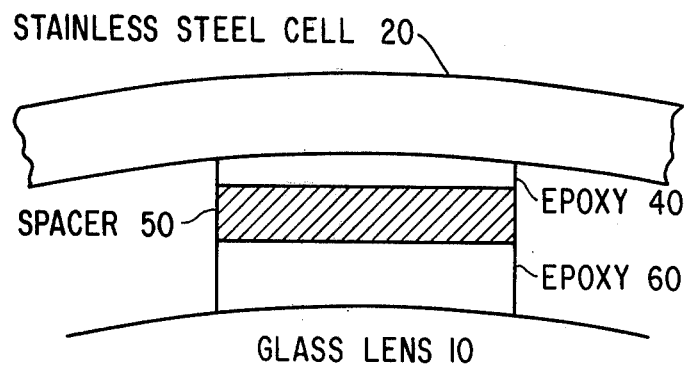
FIG. 3 illustrates the use of a flat spacer in the invention.

To minimize the tangential stresses applied to the glass lens 10, I have intentionally increased the thickness of epoxy layer 60, proximate to the glass lens. The epoxy is highly compliant and effectively cushions the glass lens 10 from the tangential stresses caused by different temperature coefficients of expansion between the aluminum spacer 50 and the glass lens 10 as temperature varies. Another factor incorporated in the preferred embodiment to minimize tangential stresses is the use of an easily produced flat round aluminum spacer 50 as illustrated in FIGS. 2 and 3. The use of a flat spacer further increases the thickness of cushioning epoxy layer 60 proximate to the glass lens 10 along the periphery of the sandwich 30, where the tangential stresses are maximum. The use of a round spacer minimizes the bond line lengths required and minimizes areas of stress concentration, further reducing the tangential stresses and the possibility of pullout.

Figure 4:
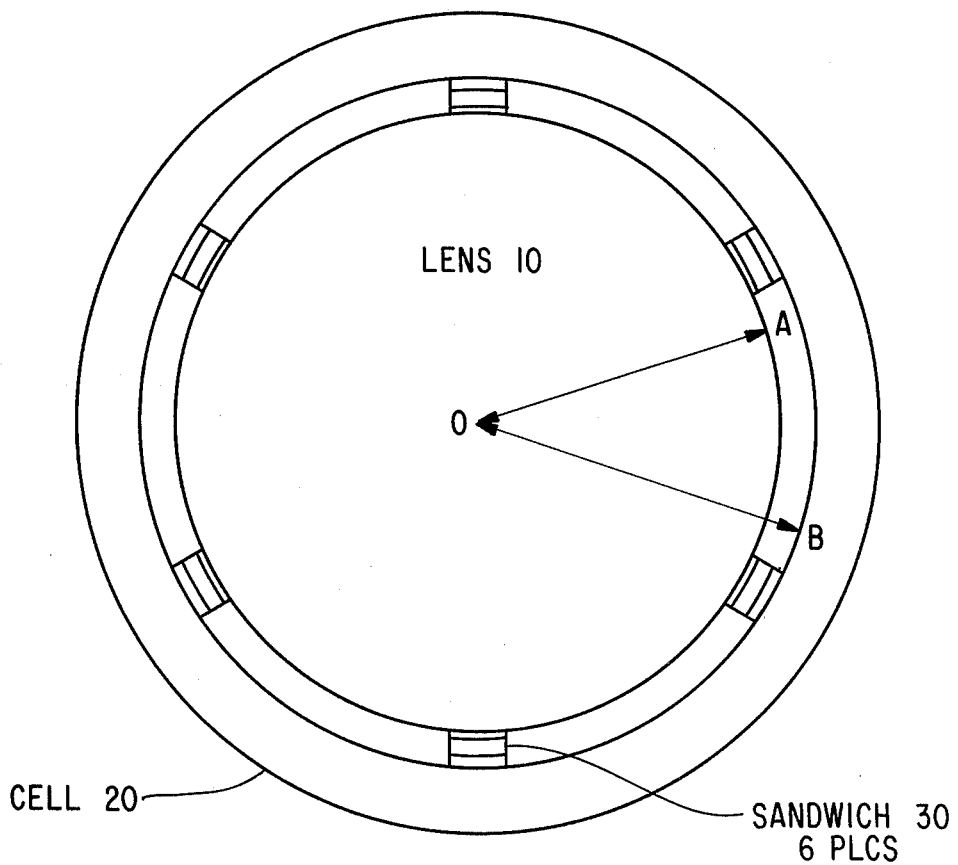
FIG. 4 illustrates the use of multiple sandwiches to suspend a lens within a cell.

The present invention uses 6 sandwiches spaced equally about the glass lens attaching it to a cell as shown in FIG. 4. However, it would be obvious to use any number of mounts greater than two to secure a glass lens to a cell.

We claim:

1. Apparatus for mounting a circular optical element in axial alignment within a circular aperture of a frame, the element having a first radius and the aperture having a second radius greater than the first radius, the frame and the optical element having different temperature coefficients of expansion and the distance between the outer circumference of the optical element and the circumference of the aperture being a function of temperature and of the respective temperature coefficients of expansion, the apparatus comprising:

a plurality of mounting means each positioned between and bonded to the frame and the optical element and each having a dimension which varies as a function of temperature and the temperature coefficient of expansion of the mounting means and which substantially equals the distance between the optical element and the frame over a range of temperatures.

2. Apparatus as in claim 1 wherein each of the mounting means comprises:

a spacer having a first dimension CD and a temperature coefficient of expansion $t_{c4}$, said spacer positioned between the frame and the optical element;

a first layer of adhesive having a second dimension BC and a temperature coefficient of expansion $t_{c31}$, said first layer of adhesive bonding the frame to said spacer;

a second layer of adhesive having a third dimension AD and a third temperature coefficient of expansion $t_{c32}$, said second layer of adhesive bonding the optical element to said spacer;

the optical element having a radius OA and a temperature coefficient of expansion $t_{c2}$, and the frame having a temperature coefficient of expansion $t_{c1}$, the circular aperture thereof having a second radius, OB;

the dimensions, radii, and coefficients being selected to substantially comply with the following relationship:

$$OB*t_{c1} - OA*t_{c2} = t_{c31}*BC + t_{c32}*AD + t_{c4}*CD.$$

3. Apparatus as in claim 2 wherein the first and second layers of adhesive have substantially equal temperature coefficients of expansion.

4. Apparatus as in claim 3 wherein the first and second layers of adhesive comprise epoxy.

5. Apparatus as in claim 4 wherein said spacer comprises a flat circular disc.

6. Apparatus as in claim 3 wherein the dimension AD of the second layer of adhesive is more than twice the dimension BC of the first layer of adhesive.

* * * * *